June 4, 1968 C. G. MATSON 3,386,296
VIBRATION MECHANISM AND METHOD
Filed Jan. 10, 1966 4 Sheets-Sheet 1
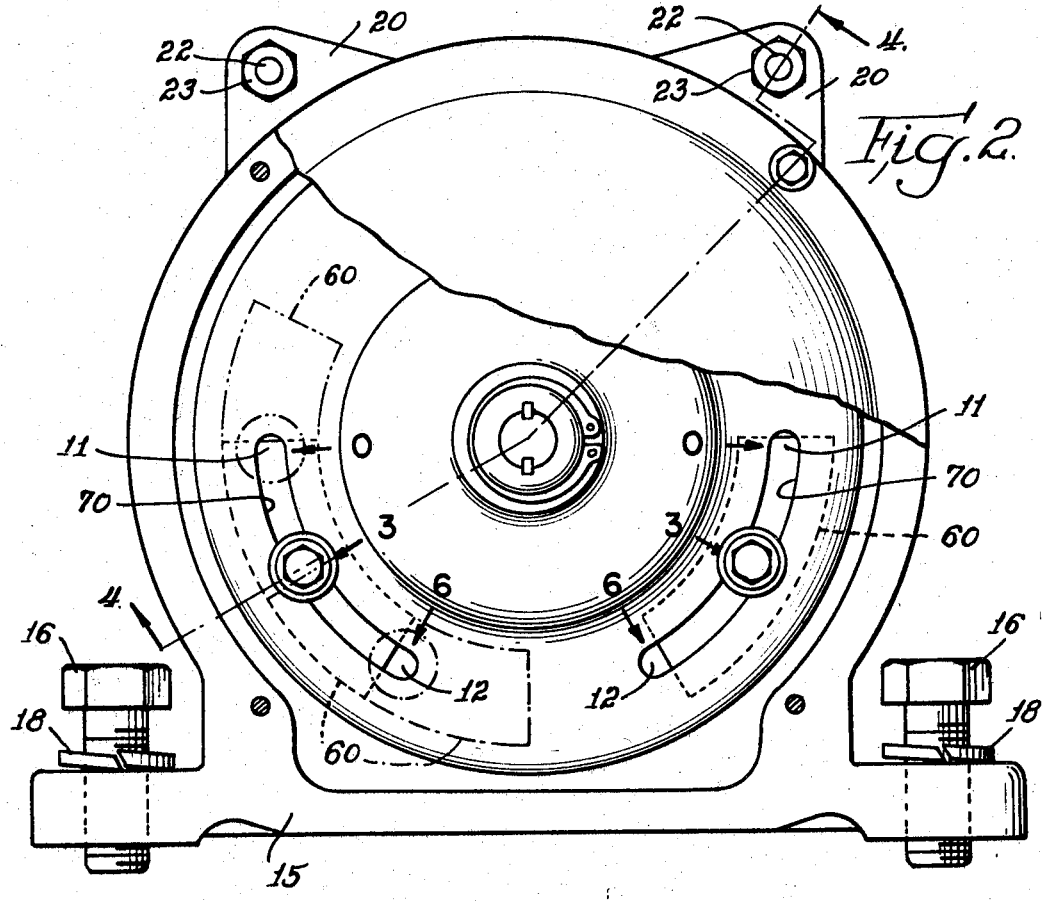
Fig. 2.
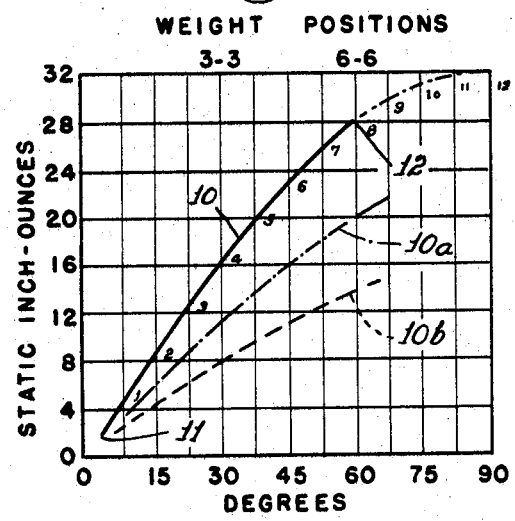
Fig. 1.
Fig. 3.
Inventor
Carl G. Matson
By
J. D. Holmes
Agent Inventor
Carl G. Matson
By
G.V. Holmes
Agent Inventor
Carl G. Matson
By G.T. Holmes
Agent

United States Patent Office 3,386,296
Patented June 4, 1968

3,386,296
VIBRATION MECHANISM AND METHOD
Carl G. Matson, 401 E. Central Blvd.,
Kewanee, Ill. 61443
Filed Jan. 10, 1966, Ser. No. 519,614
9 Claims. (Cl. 74—87)

ABSTRACT OF THE DISCLOSURE

Vibrating mechanism for mechanically vibrating apparatus wherein a shaft carries a balance wheel having eccentric weight means thereon, the shaft only being journalled in bearings and the weight means being located in spaced relation to the bearing means for distributing force to the bearing means.

---

The present invention relates to improvements in vibrators; and more particularly to vibrators which have an eccentric mass that is driven around a center of rotation to induce the vibrations to machine elements upon which the vibrator is attached.

More specifically, the present vibrator is directed to an improved arrangement of parts whereby the eccentrically cycling force is absorbed by bearings arranged with respect to the vibrating mass whereby to attain long bearing life. An additional feature of the present invention is the provision of a vibrator wherein masses may be adjusted to achieve different degrees of eccentric mass for applying the vibrator to apparatus to impart different amplitudes of vibration whereby to achieve desirable new results in a single vibrator.

Accordingly, an important object of the present invention is to provide a vibrator with improved assembled relationships of the eccentric mass with respect to the bearings about which the mass rotates whereby to increase the life of a vibrator.

Another important object of the invention is to provide for adjustment of weights and interchangeability of weights of different mass materials whereby to achieve cyclic vibrations at different amplitudes.

Another important object of the invention is to provide a vibrator with a plurality of masses arranged with respect to bearings supporting same for distributing the force cyclically applied to the bearings by the rotating weight in an improved manner to prolong bearing life.

Further objects and advantages reside in the ready adaptability of mounting power-driving means to the vibrator in either narrow flange or wide flange arrangements to accommodate hydraulic, pneumatic and electric prime movers for the vibrating device.

Other objects and advantages reside in the details of construction and arrangement of parts and will be either obvious or pointed out in the following specification and claims as read in view of the accompanying drawings in which:

FIG. 1 is a diagram of a variable force function to be achieved by adjustable weights in the vibrator to be described hereinbelow;

FIG. 2 is an elevational view with parts broken away to show internal details of construction of a presently preferred form of an adjustable eccentric mass vibrator;

FIG. 3 is a detail perspective view of a typical weight used in the vibrator shown in FIGS. 1 and 2;

Figure 4:
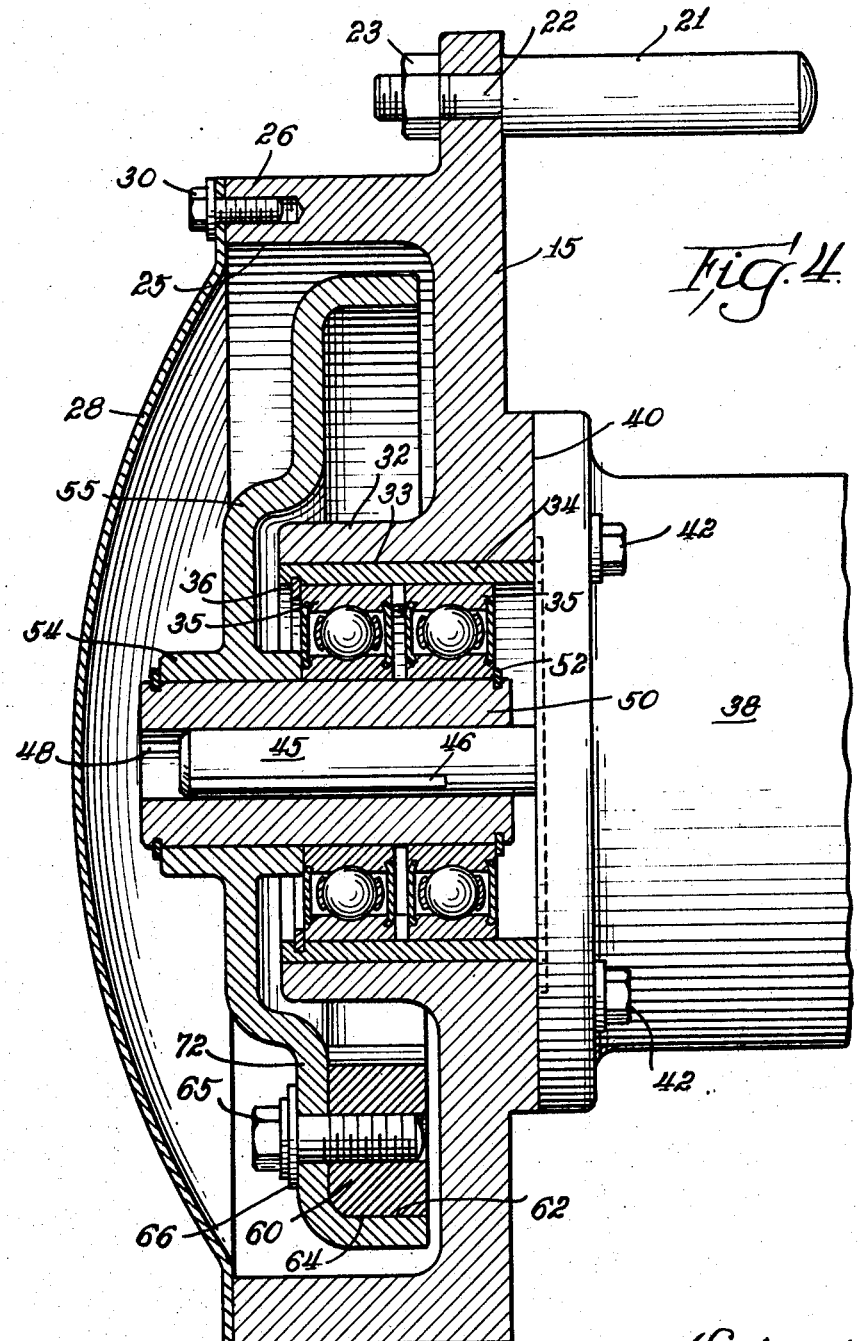
FIG. 4 is a sectional view taken generally along the lines 4—4 of FIG. 2.

Referring now for details of the invention to the drawings and first to FIGS. 2, 3 and 4, a general utility vibrator for providing for different amplitudes of force for imparting vibrations to apparatus on which same is attached is shown. FIG. 1 is a chart showing a desirable range of adjustment of weights to be described more fully hereinbelow.

In FIG. 1 a trace 10 of a sine curve having a useful range, in the modification to be described in detail below, from a point 11 to a point 12, through which range weights may be adjusted from substantially a zero unbalance force position, with the weights opposite the axis of rotation, to a point where each is adjusted through substantially 60 degrees at the point 12 away from the zero position where a maximum amplitude of vibration is imparted to a device on which the vibrator is attached. It is to be noted that the trace 10 lies in nearly a linear range of adjustment and accordingly the vibrator will impart a generally uniform degree of variation of vibration as the weights are adjusted upwardly along the trace 10 from the point 11 where minimum vibration is induced, through the maximum point 12 where a maximum amplitude is imparted because the weights lie generally adjacent each other on the same side of the center of rotation.

Referring to FIGS. 2, 3, and 4 for details of construction, a housing 15 is adapted to be secured by machine bolts 16 to a device to be vibrated, not shown, in a manner well known in the vibrating art. The machine screws 16 are turned down on lock washers 18 to securely hold the vibrator on the apparatus or device to be vibrated. The upper end of the housing 15 is supplied with ears 20 which support handles 21 by means of carriage bolts 22 or the like secured in place by nuts 23.

The housing 15 has a hollow cylindrical interior 25 to the edge 26 of which a shield 28 may be attached by suitable bolt structure 30 to protect rotating parts against interference and prevent injury of personnel who might be adjacent the rotating apparatus. The housing 15 has an internal cylindrical boss 32 which is bored out at 33 to receive a sleeve 34 mounting bearings 35 which are held in place by a snap ring 36 within the sleeve 34.

A suitable motor 38, which may be electric, hydraulic or pneumatic, is secured to a face 40 by suitable machine screws 42. This arrangement provides a narrow flange mounting for the motor 38. A wide flange mount is provided by the peripheral edge 26 of the housing when wide flange apparatus is adapted to be attached to drive the vibrator to be described hereinbelow. The motor 38 has a drive shaft 45 secured by suitable means such as two keys 46, only one being shown, but a key slot 48 being shown on the opposite side for accommodating, at 180 degree radially spaced position, a key similar to key 46 to a shaft 50 mounted interiorly of the bearings 35 secured by a snap ring 52 at one end. The opposite end of the shaft 50 is secured to a hub 54 of a cup 55 to which weights 60 are attached internally in spaced-apart relation as shown in dotted lines, FIG. 2.

The internal surface 62 of the outlying edge of the cup 55 is sized to fit the external edge 64 of the weights 60. The weights 60 are secured by machine screws 65 and lock washers 66. A pair of slots 70 are provided in the web 72 of the cup 50 to permit adjustment of the weights between the positions 11 and 12 shown on charge 1 and indicated at positions 11 and 12 in FIG. 2. As illustrated in the drawings, the weights are each adjusted at points 3—3, also indicated at the top line of the chart of FIG. 1. It is to be noted by considering the trace 10 that the positions 3—3 indicate approximately one-half of the maximum amplitude of vibrations imparted by the apparatus of this modification of the invention.

It is contemplated that the weight 60 will be made of different kinds of materials further to modify the trace 10 in a family of curves 10a, 10b, etc., if the trace 10 be considered that approximating the weight of steel or bronze or the like and trace 10a being for aluminum and 10b being for magnesium. Of course, both lighter and heavier weight materials and metals can be used in this invention, even though same may be brittle, inasmuch as the reaction of the weight under centrifugal force is applied to the surface 62 at the interior of the peripheral web of the cup 55.

As mentioned briefly above, the housing 15 can also support a wide flange mount around the periphery 26, which mount would be adapted to nest over the hub 54 and the left-hand end of the shaft 50 by means of a suitable adapter plate believed to be obvious in view of the teachings of the invention herein. In such mounting the motor shaft 45 will, of course, be inserted into the right-hand end of the shaft 50, and the exposed side 40 of the housing 15 can be suitably covered if desired.

The forces created by the eccentric weights 60 will be absorbed substantially equally by the bearings 35 inasmuch as the mass of the weights is close to the line of a plane lying between the two bearings. The weight of the bell-shaped member 55, while rotating, cancels out inasmuch as the same is generally symmetrical around its entire surface except for the metal that is removed to form the slots 70, FIG. 2. The positioning of the centers of the mass of the weight 60 is absorbed about equally by the bearings 35, which contributes to long bearing life.

Figure 5:
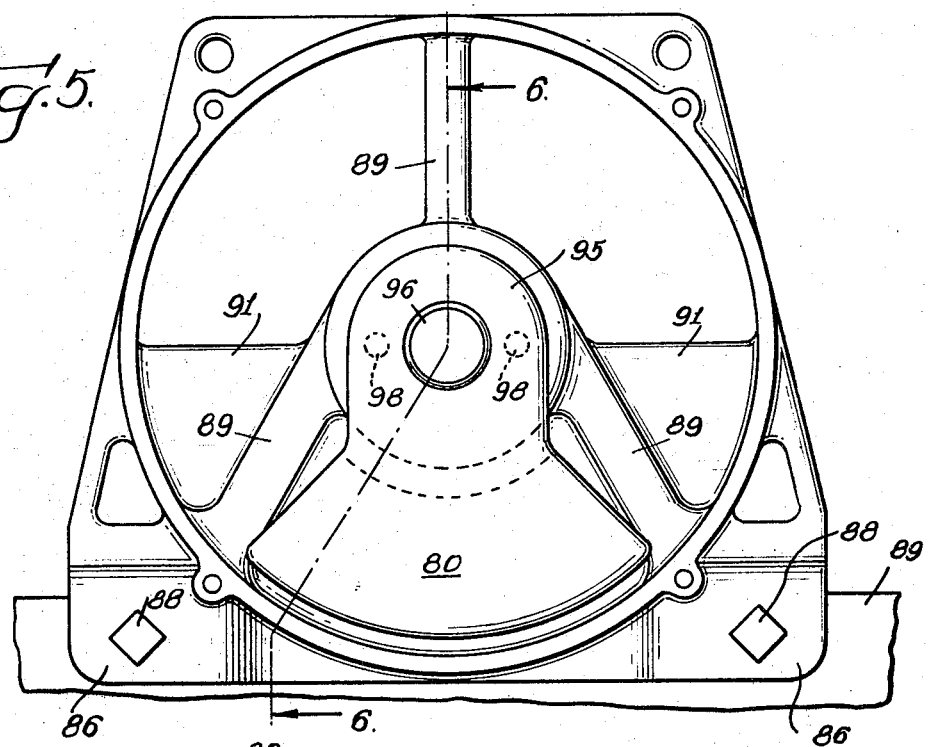
FIG. 5 is a view of a vibrator having a pair of similar masses arranged on opposite sides of a pair of bearings.
Figure 6:
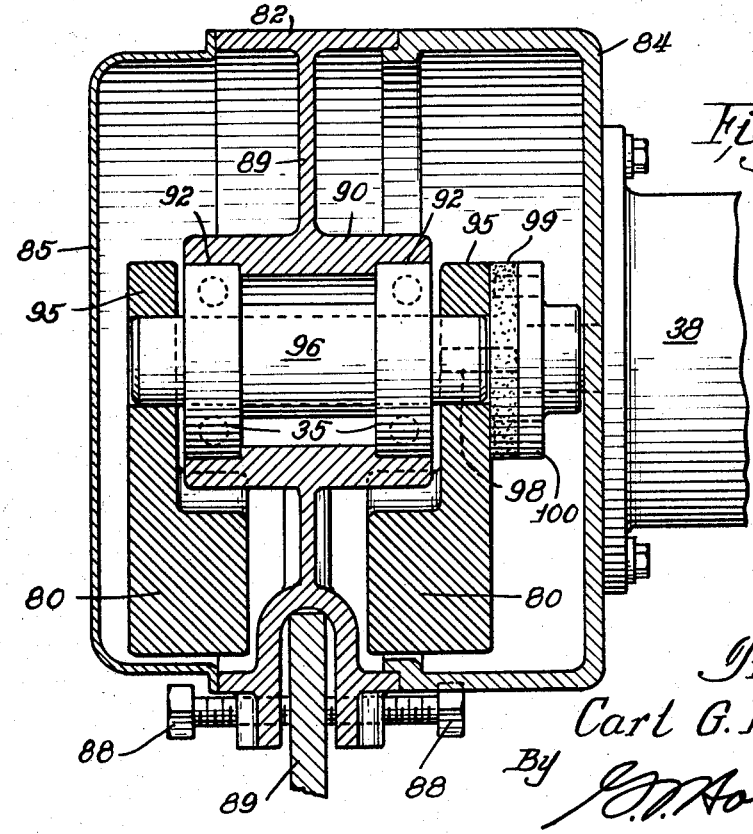
FIG. 6 is a sectional view taken generally along the lines 6—6 of FIG. 5.

The modification of the invention shown in FIGS. 5 and 6 comprises a pair of generally identical weights 80 positioned to have a net effect equally about each of a pair of bearings 35. In this embobdiment of the invention a housing 82 supports a motor mounting plate 84 and a shield 85 in obvious manner. The housing 82 has depending flanges 86 at either side thereof to receive a pair of machine screws 88 for mounting the housing on an upstanding web 88 of a structural shape, or edge of structural members of many different sorts, which can be vibrated by the device.

A central boss 90 is supported on struts or spokes 89, the lower two of which are reinforced by webs 91. The central boss 90 is apertured and counterbored at each side 92 to receive the bearings 35 with a press fit. Each weight 80 is generally L-shaped and the upstanding end of the weight 80 terminates in an ear 95 which can be keyed to a shaft 96 turning in the bearings 35. One or both of the ears 35 has a pair of holes 96 therein for receiving pins 98 to secure a flexible coupling 99 to a coupling half 100 connected by conventional shaft connections to the drive motor 38. The weights can be made of different kinds of material and/or be of different sizes to achieve different eccentric mass attributes.

In the modification of the invention shown in FIGS. 5 and 6, the total mass of the weights 80 is centered precisely between the bearings 35 and this apparatus accordingly will distribute the forces due to cyclically induced vibrations caused by rotating of the masses 80 generally equally to each of the bearings 35 whereby to achieve long bearing life.

Figures 7, 8:
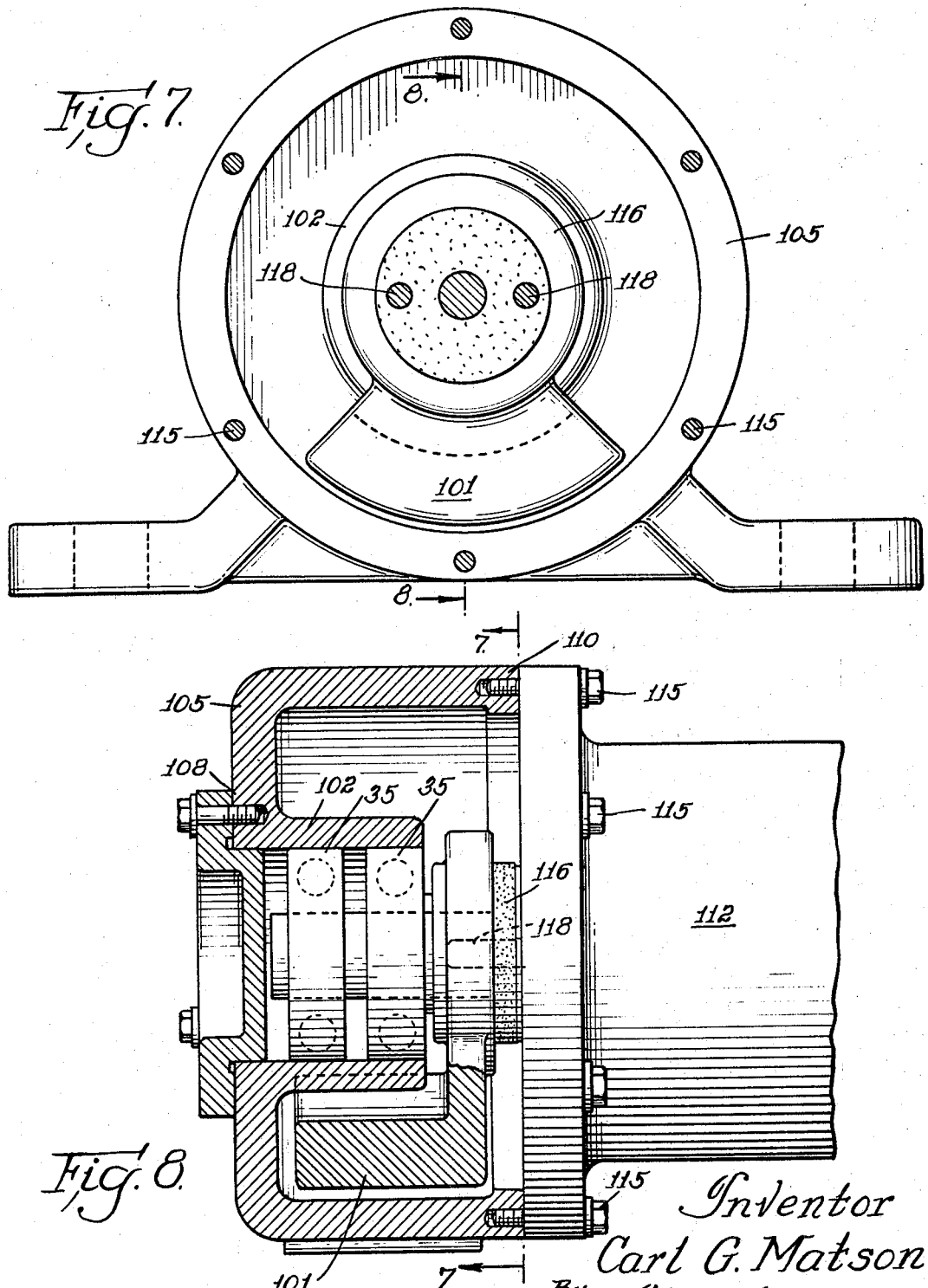
FIG. 7 is an elevational view with the cover removed of another modification of the invention taken generally along the lines 7—7 of FIG. 8.
FIG. 8 is a sectional view taken generally along the lines 8—8 of FIG. 7.

The modification of the invention shown in FIGS. 7 and 8 has a single generally L-shaped weight 101 which has a longer bottom leg on the L whereby to move the mass of the weight 101 generally beneath the two bearings 35 which are spaced apart in the interior of a boss 102 within a housing 105. It is to be noted that the housing 105 has a left-hand face 108 adapted to receive a narrow flange mounting, and the right-hand edge 110 is shown as supporting a motor 112 of the wide flange type by means of machine screws 115.

The upstanding leg 116 of the generally L-shaped weight 101 is provided with a pair of holes to receive pins 118 to accommodate a flexible drive of a coupling generally in the same manner as described in connection with FIGS. 5 and 6, and believed to be obvious from the prior description.

While preferred modifications of the present invention have been disclosed in detail to enable others skilled in the art to practice the invention, obviously, in view of the disclosure hereof, other modifications of the invention will occur to those working in the art. For this reason this disclosure is not to be construed in a limiting sense, and the invention is to be limited only by the spirit and scope of the following claims.

I claim:

1. Vibration mechanism for mechanically vibrating apparatus to which same is attached, said mechanism comprising a housing, bearing means in said housing providing spaced apart bearing points, a shaft carried by said bearing means and being rotatably supported in said housing at said spaced apart bearing points, eccentric weight means, connecting means mounted only on said shaft and carrying said eccentric weight means in a predetermined location spaced from said bearing means and wherein the center of mass of said weight means occupies a position relative to said bearing means for distributing force in a predetermined ratio to each of said bearing points, and motor means connected to said shaft for driving said weight means in a manner to cause said center of mass of said weight means to orbit in a plane normal to the axis of said bearing means.

2. Vibration mechanism such as set forth in claim 1, said weight means comprising two masses having a common center of mass occupying a position between said bearing points.

3. Vibration mechanism such as set forth in claim 1, motor mount means for attaching said motor means to said housing, and said housing having surfaces for accommodating at least two sizes of mount means.

4. Vibration mechanism such as set forth in claim 1, said connecting means comprising a cup-shaped member having an internal shoulder, and said weight means bearing upon said shoulder during operation of the mechanism under the influence of centrifugal force.

5. Vibration mechanism such as set forth in claim 2, said two masses being adjustable to vary the effective eccentric common center of mass of said weight means.

6. Vibration mechanism such as set forth in claim 4, said two masses being adjustable to vary the effective eccentric common center of mass of said weight means.

7. Vibration mechanism such as set forth in claim 5, the adjustment of said masses causing said common center of mass generally to follow a sine curve.

8. Vibration mechanism such as set forth in claim 5, said two masses being of selectively different materials to vary the total eccentric mass.

9. Vibration mechanism such as set forth in claim 8, said different materials causing the adjustment of said masses to form a family of sine curves.

References Cited

UNITED STATES PATENTS

| 2,847,860 | 8/1958 | Porter | 74—87 |
|---|---|---|---|
| 2,972,688 | 2/1961 | Mahlfeldt. | |
| 3,128,582 | 4/1964 | Winther | 74—573 X |
| 1,324,125 | 12/1919 | McKelvey | 74—61 |
| 2,947,183 | 8/1960 | Carrier et al. | 74—61 |

FRED C. MATTERN, JR., *Primary Examiner.*

W. S. RATLIFF, *Assistant Examiner.*